Sept. 21, 1965 L. HUNTER 3,207,557
MEANS FOR CENTERING TIRE TREAD TO VEHICLE
WHEEL AXIS OF ROTATION
Filed Dec. 26, 1963 2 Sheets-Sheet 1

INVENTOR:
LEE HUNTER
BY Gravely, Lieder & Woodruff
ATTORNEYS.

Sept. 21, 1965                L. HUNTER                3,207,557
MEANS FOR CENTERING TIRE TREAD TO VEHICLE
WHEEL AXIS OF ROTATION
Filed Dec. 26, 1963                                    2 Sheets-Sheet 2

INVENTOR:
LEE HUNTER
BY Gravely, Lieder & Woodruff
ATTORNEYS.

United States Patent Office 3,207,557
Patented Sept. 21, 1965

3,207,557
MEANS FOR CENTERING TIRE TREAD TO
VEHICLE WHEEL AXIS OF ROTATION
Lee Hunter, Rte. 1, Box 136, Creve Coeur, Mo.
Filed Dec. 26, 1963, Ser. No. 333,490
4 Claims. (Cl. 301—5)

This invention relates to improvements in means for mounting vehicle wheels and is especially concerned with obtaining a concentric correlation between the tread of the tire and the axis of turning of the wheel.

The mass production of tire casings of pneumatic and other designs is a well developed art and has brought the cost within reach of vehicle owners. However, the development of tire manufacture has been forced to keep pace with the new designs and improvements in vehicle wheel suspension assemblies, so that as ride characteristics are improved the tires used therewith will be suitably adapted to contribute to the overall improvements sought. Areas of improvement of significance in wheel suspension have been in the independent mounting of wheels, and in the soft ride characteristics. These improvements have caused the vehicle to become exceedingly sensitive to eccentricity as well as out of balance conditions of all wheels and tires, and great care is required to check wheel concentricity and balance. In spite of better wheel balancing equipment available to manufacturers and service people, there is an area where still better wheel and tire action can be obtained. The latter lies in the attention given to matching wheels, wheel mountings, and tire treads for concentricity.

Some efforts have been directed to manufacturing tires to close tolerances so that the tread circle is concentric with the bead circle on the theory that the wheel rims on which tires are mounted are made to a concentric relation with the vehicle hub and axis of wheel bearings. Other efforts have been directed to providing grinding apparatus which treat mounted tires to grind the treads to the axis of rotation. The objection to use of grinding apparatus is that it usually changes the tread of the tire, by heat or thinning the tread in local areas, or by both effects, and this renders the tire unreliable. Tire manufacturers usually guarantee tire performance, but cannot stand behind guarantees if tires are altered in any way, such as by grinding. The mass production of tires has, up to the present, been on a basis of meeting certain liberal tolerances of circularity of tread, and correlation of tread circle to bead circle. However, there is no easy way for tire makers and wheel fabricators to co-ordinate production tolerances so that tires and wheels can be made to fit concentrically every time. The correlation of these factors has been ignored, usually on the theory that a good balancing job will minimize the disturbance to smooth wheel and tire operation.

With the foregoing problems in view, the present invention is directed to means for centering tire treads to vehicle wheels, and to centering the tire and wheel assembly to the axis of rotation so that no tread grinding is needed and nothing is done to invalidate the manufacturers guaranty. Such means will overcome the problem of eccentricity in its relation to wheel and tire matching, and make the work of obtaining better or precise balance easier and more accurate. The invention is disclosed in certain forms, one of which includes the provision of a simple and inexpensive set of eccentrically formed elements which will hold the tire equipped wheel in position to correct for eccentricity of the tire tread relative to the axis of rotation. Another form of the invention resides in the making of wheel and mountings with machined surfaces for piloting the mounting thereof from other than the usual bolt circle, in combination with a set of elements which function to retain the wheel in desired position established by the machined surfaces. The first form of the invention is primarily intended for application to vehicles already in service, while the second form is intended for use as part of vehicles in the process of original manufacture.

It is therefore, an object of this invention to provide means in the form of sets of eccentric means to be applied to the center opening and bolt apertures of vehicle wheels, such eccentric means being adapted to center the tire tread circle to the axis of rotation for the vehicle so that correlation of the tire tread to the axis of rotation can be obtained easily.

It is another object of this invention to provide an improved wheel and hub assembly with cooperating pilot surfaces for bringing the same into concentric-relation, and to provide means cooperating with the wheel and hub to retain the concentric relationship, whereby the tire tread circle may be brought into closer concentric relation to the axis of rotation.

Another object of the invention is to provide a method of mounting a tire and wheel upon a vehicle to establish a close or substantially precise concentric relationship of tire tread circle to axis of rotation, whereby wheel unbalance due to eccentricity between wheel and tire may be reduced or substantially eliminated as a factor in obtaining balance of the assembly.

Other objects and advantages of the present invention reside in the elements of structure and cooperating components applied to the structure thereof, and the method attendant thereon, all as will be pointed out or as may come to mind in connection with the disclosure to be provided in the following description when considered in view of the accompanying drawings, wherein.

Figures 1, 2, 3:
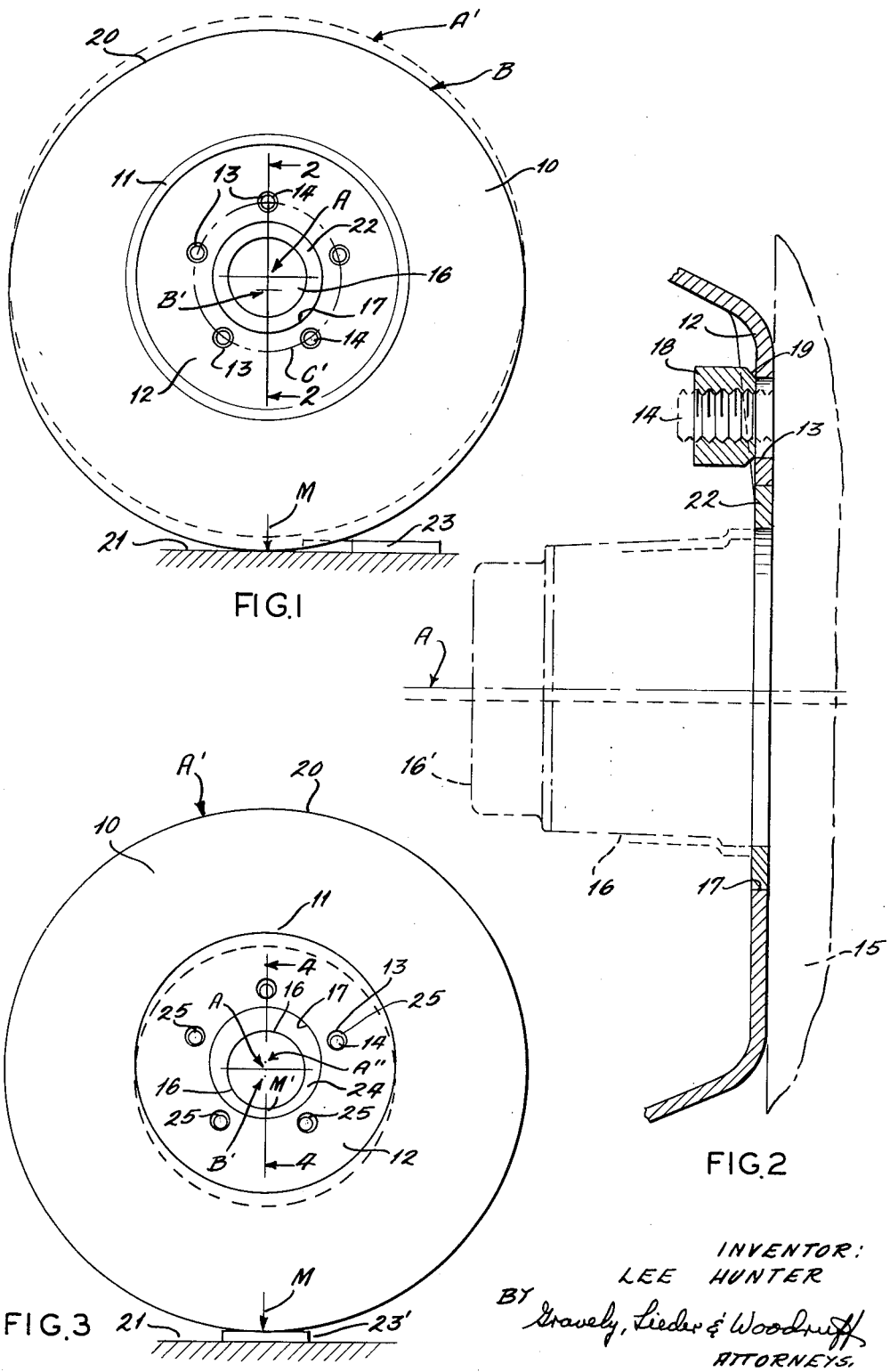
FIG. 1 is a side elevational view of a vehicle tire and wheel assembly shown schematically on a vehicle hub and illustrating the problem encountered when a tire tread is eccentric to the axis of rotation for the hub.
FIG. 2 is a fragmentary sectional view on a greatly enlarged scale taken at line 2—2 in FIG. 1.
FIG. 3 is a side elevational view of the tire and wheel assembly showing the present invention applied thereto to correct for tread eccentricity.

In FIGS. 1 and 2 there is shown a vehicle tire 10 mounted on the rim 11 of the wheel disc 12 in the usual manner. The disc 12 is formed with a series of apertures 13 in circular spaced relation to receive the usual lug bolts 14 on the drum plate 15. The hub or housing 16 and cap 16' enclose the usual vehicle wheel mounting spindle bearings and are received in the center opening 17 of the disc 12. While a front wheel disc 12 is illustrated, the principles apply equally well to rear wheels as well. The wheel disc 12 is usually made with the apertures 13 on a circle concentric with the circle for bolts 14, and the disc 12 is secured by lug nuts 18, each having a cone-shaped nose 19 which enters the several apertures 13 and tends to center the same to the axis of the bolt 14. Thus, in the usual case there is no concern with maintaining or even trying to locate the center opening in wheel disc 12 concentrically or in a predetermined relation with the spindle axis A. All of this is usual and results in failure to achieve concentricity of the tire tread 20 or the mounting rim 11 with the axis A so that the rolling action of the tire tread 20 on the surface 21 actually causes the axis A of the housing 16 to rise and fall since it is forced to continuously seek a position within the circle of the tire tread 20. The result is that the housing 16 of the vehicle moves eccentrically relative to surface 21 and causes vibration in the vehicle and undesirable loads on the bearings (not shown) within the housing 16.

The conditions described above are shown in FIG. 1 where the axis A for the wheel has its true rolling circle shown in broken outline at A', whereas the tire tread 20 has its tread circle in the full line circle B with center at B'. In order to correct the assembly of the wheel disc 12 and housing 16 and obtain a concentric relationship, a concentric spacer element 22 is first fitted over the housing 16 and into the center opening 17, and the nuts 18 are turned up snug.

The wheel and tire assembly is jacked up by usual means (not necessary to show) and the tire 10 is rotated while the tread 20 is observed as it passes the surface 21. The tread 20 will be found to have a point when it is closest to the surface 21 and another point farthest therefrom. A mark M is placed on the side of the tire 10 at the point where the tread 20 just touches or comes closest to the surface 21, the jacking means being adjusted to accomplish this. The amount of vertical movement of the tread 20 between its highest and lowest points relative to surface 21 is determined, and a convenient way to do this is to use the proper one of a set of spacer blocks 23 which are graduated in thickness in increments, such as one thirty-second, one-sixteenth, three thirty-seconds, and one-eighth inch. Other increments, of course, for these blocks 23 may be supplied. The proper spacer block 23 is that one which just fits when the tire 10 is rotated to its maximum spacing of the tread 20 from surface 21. The dimensional marking on the block 23 will give the amount of eccentricity of the tire tread 20 to the axis A. This dimension is then divided by two so that the tread 20 can be brought to a position where it will substantially rotate past surface 21 with the least rise or fall. Having determined the value of the eccentricity of the tire tread 20, the concentric spacer 22 is removed from the housing 16 and eccentric spacer ring elements are applied in the manner now to be described.

Figure 4:
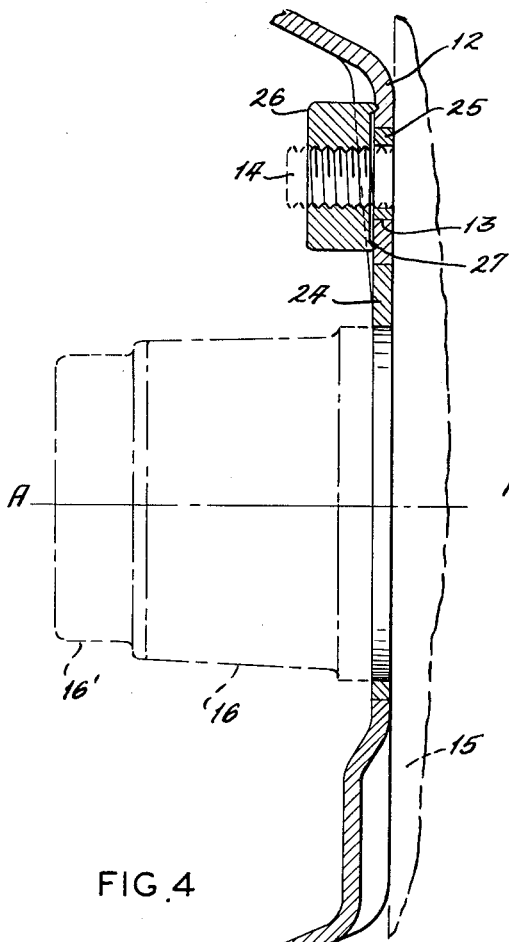
FIG. 4 is a greatly enlarged and fragmentary sectional view taken at line 4—4 in FIG. 3.

With reference to FIGS. 3 and 4, it can be seen that the tire 10 and its wheel disc 12 have been lifted or shifted relative to the axis A of the housing 16 in a vertical direction while the marking M is at the bottom of the tire. The shift moves the center point A" of the aperture 17 vertically and above the axis A, and can be conveniently held by using a spacer block 23' corresponding to one-half the dimension of the first block 23 shown in FIG. 1. A principal eccentric ring spacer 24 is then placed over the housing 16 and a mark M' thereon is turned to be located in vertical alignment with the first mark M on the tire 10. The principal ring 24 is one of a plurality of such elements on which the marks M' are located at the thin or narrowest point thereof. Each ring 24 in a set may be marked to show the dimension of the thin side, and such dimensions are provided in increments (as before suggested) to include the range of eccentricity encountered in tires 10. The proper ring 24 is located with its mark M' aligned with the tire mark M while the wheel disc aperture 17 is fitted over the housing 16 and this will provide for shifting the wheel disc 12 so that the apertures 13 for the bolts 14 shift to eccentric relationships. Two or more secondary eccentric rings 25 may then be slipped over each bolt 14 and into the apertures 13 to properly relate the bolts in the apertures. A full set of five secondary eccentric rings 25 is shown. The wheel disc 12 is then secured in position by nuts 26, and each nut 26 has a hardened projection 27 thereon which grips the surface of the disc 12 to prevent the shifting of the same under the torque effect of acceleration and braking of the vehicle.

Each principal ring 24 of a set thereof is provided with a correlated set of secondary rings 25 so that the desired eccentric mounting of the wheel disc 12 may be achieved for the degree of eccentricity correction found needed to bring the tire tread 20 into a substantially true rolling relation with the vehicle axis A. It will be appreciated that the wheel disc aperture 17 is eccentric to the axis A as its center is now located at point A" as shown in FIG. 3, whereas in FIG. 1 these axes coincided at point A. The eccentric rings 24 and 25 retain the wheel disc 12 in its shifted position.

Figure 6:
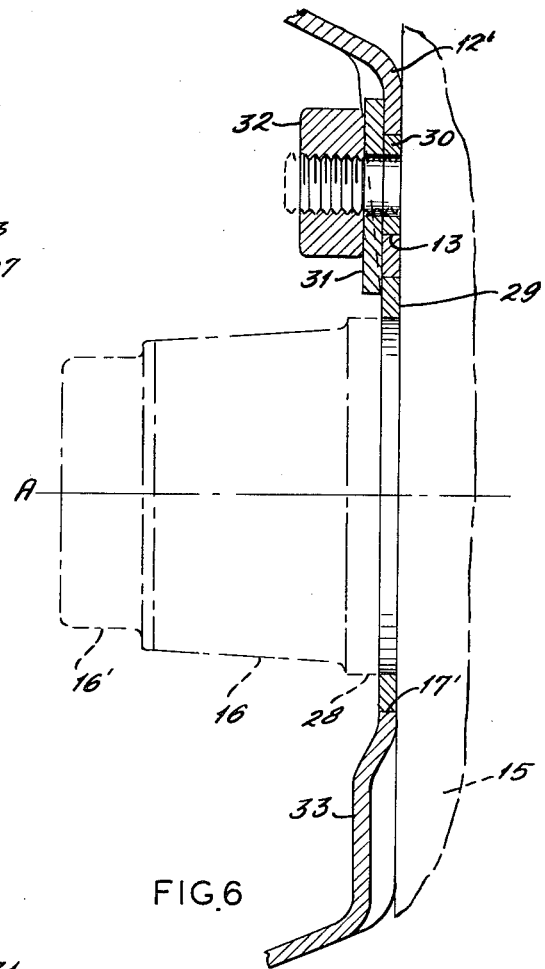
FIG. 6 is a greatly enlarged fragmentary sectional view taken at line 6—6 in FIG. 5.
Figure 5:
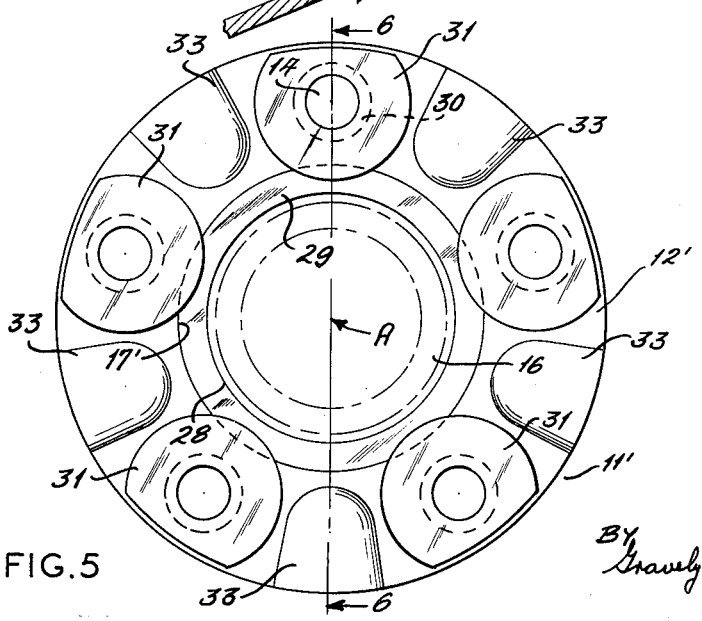
FIG. 5 is an enlarged fragmentary side elevational view of a tire and wheel mounting assembly showing a different form which this invention may take.

While the disclosure heretofore described in FIGS. 1 to 2 has been given in connection with the usual conditions encountered by the vast majority of vehicles where the wheel disc 12 is centered to the circle for the bolts 14, it is a feature of this invention to accomplish substantially close tire tread centering results by locating the wheel disc 12' from a machined surface on the hub or housing 16. This modification is shown in FIGS. 5 and 6 where the housing 16 is formed with a machined surface 28 in the plane of the wheel disc 12'. The wheel disc 12' also is formed during manufacture with its center aperture 17' substantially concentrically related to the rim 11 upon which the tire 10 is mounted (see FIG. 1). As a result of attention being given to the concentric formation of surfaces 28 and 17' relative to the axis A, the bolt apertures 13 are no longer used to pilot the wheel mounting in conjunction with the cone-shaped nose 19 (FIG. 2) on the holding nuts 18. Consequently, the eccentricity between the tire tread 20 and its center is not nearly so greatly magnified as formerly was the situation when using the circuit of bolts 14, and the problem of getting the bearing axis A substantially close to the center of the tread circle is greatly reduced.

In the modified arrangement shown in FIGS. 5 and 6, the wheel disc 12' is centered on the housing surface 28 by the application of a principal concentric ring 29 seated on the surface 28 and piloting the aperture 17' of the wheel disc 12' so that the tire receiving rim is very nearly centered to axis A. Final locating and attachment of the wheel disc 12' is obtained by inserting two or more secondary bolt rings 30 over the bolts 14 and into the bolt receiving apertures 13. The secondary rings 30 may be sufficiently eccentric to properly fit, as now the circle of bolts 14 may be more or less eccentric to the circle of holes 13. Holding washers 31 are positioned on top of the secondary rings 30 and nuts 32 are threaded thereover. The washers 31 are enlarged sufficiently to extend inwardly and lap the ring 29 so as to retain the latter in position. Nuts tightly load the washers against the rings 30 and hold the same against turning so that vehicle acceleration and braking will not cause the wheel disc 12' to shift out of position. The wheel disc 12' of the modification is stiffened by the formation of raised portions 33 between bolt apertures 13.

The views of FIGS. 3 and 4 have been shown without means to retain the eccentric principal ring element 24 in position. Such means, however, can be a washer such as is shown at 31 in FIG. 5, and one or more washers may be used for this purpose. The omission of holding means for element 24 in FIGS. 3 and 4 is to avoid obscuring the disclosure in said views.

In the assembly disclosed in FIGS. 2, 3 and 4 the principal element 24 has an outer peripheral surface which bears a predetermined relationship to the axis of wheel rotation, even though the surface is eccentric. The position of the latter surface is fixed when the direction of maximum shift has been found, and this then is used to locate the wheel disc 12 so that the circle of lug bolts 14 can be entirely ignored when mounting the tire and wheel disc 12. In this case the rim 11 for the tire 10 is also ignored as the concentric locating goes directly to finding the center for the tread circle and bringing that center into substantial coincidence with the axis A of rotation. Thus, the center opening 17 in the wheel disc 12 may be eccentric to axis A, but the tread is caused to run true. In the modification, the wheel rim 11 and disc opening 17' are made nearly concentric so that the tire tread is also substantially concentric, within makers tolerances, and the use of a carefully formed element 29 on the hub surface 28 eliminates the need to use the circle of lug bolts 14 to locate the wheel and tire.

It may now be appreciated from the foregoing disclosure in what manner a vehicle tire may be mounted on the vehicle to have its tread rotate concentrically, or nearly concentrically, about the axis of the supporting spindle or axle. Certain preferred arrangements of the present invention have been shown and described, but as a consequence of this disclosure variations may come to mind to those skilled in this art, and it is intended to include all such variants within the scope of the annexed claims.

What is claimed is:

1. Means for centering a vehicle tire tread to a vehicle wheel mounting having a housing establishing an axis of rotation and a drum carrying a plurality of attachment bolts arranged in spaced circular relation about the rotational axis, said means including a wheel disc having a center opening and a plurality of bolt apertures arranged in circular spaced relation about said center opening, a tire receiving rim on said wheel disc, a tire on said rim, and elements engaging said wheel disc to secure said disc and tire thereon with the tire tread in substantially centered relationship with the rotational axis, said elements comprising a principal element between said housing and disc and seated in said center opening of said disc, separate elements disposed in at least two of said bolt apertures of said disc over the attachment bolts, and holding means engaged on each of the attachment bolts and with said wheel disc, certain of said holding means acting to retain at least two elements in position.

2. Means for centering a vehicle tire tread to a vehicle wheel mounting having a housing establishing an axis of rotation and a drum carrying a plurality of attachment bolts arranged in spaced circular relation about the rotational axis, said means including a wheel disc having a center opening and a plurality of bolt apertures arranged in circular spaced relation about said center opening, a tire receiving rim on said wheel disc, a tire on said rim having a tread circle eccentric to the rotational axis, and elements engaging said wheel disc to secure said disc and tire thereon with the tire tread in substantially centered relationship with the rotational axis, said elements comprising a principal element between said housing and said center opening of said disc, other elements disposed in said bolt apertures of said disc over the attachment bolts, said principal and other elements are rings having eccentric surfaces adapted to off-set said wheel disc relative to the rotational axis an amount to shift said wheel disc and tire in a direction to concentrically relate said tread circle with the rotational axis, and holding means engaged on the attachment bolts and with said wheel disc to retain said other elements in position.

3. Means for centering a vehicle tire tread to a vehicle wheel mounting having a housing establishing an axis of rotation and a drum carrying a plurality of attachment bolts arranged in spaced circular relation about the rotational axis, said means including a wheel disc having a center opening and a plurality of bolt apertures arranged in circular spaced relation about said center opening, a tire receiving rim on said wheel disc, a tire on said rim having a tread circle eccentric to the rotational axis, and elements engaging said wheel disc to secure said disc and tire thereon with the tire tread in substantially centered relationship with the rotational axis, said elements comprising a principal element between said housing and said center opening of said disc formed with a central opening and an eccentrically related peripheral surface providing a thin portion at one side thereof, and indicia on said principal element at said thin portion, other elements disposed in said bolt apertures of said disc over the attachment bolts, and holding means engaged on the attachment bolts and with said wheel disc to retain said other elements in position.

4. Means for centering the tire tread circle of a vehicle wheel and tire assembly to the axis of rotation of the wheel comprising in combination a tire having an outer circular tread and an inner circular bead flange, a wheel having a central aperture and a tire mounting rim outwardly thereof to receive said tire bead flange, said wheel also having a plurality of lug bolt holes in circular arrangement substantially concentrically about said central aperture, a wheel mounting hub defining the axis of rotation for the wheel and tire assembly, a plurality of lug bolts carried by said hub in circular arrangement about the axis of rotation to substantially match said lug bolt holes, said central aperture in said wheel being larger than said hub and said bolt holes being larger than said lug bolts, a centering element of annular form having inner and outer circular surfaces eccentrically related, said element being fitted over said hub and seated in said central aperture to locate said wheel and tire assembly with the tire tread circle in concentric relation with the axis of rotation defined by said hub, and other means engaged with at least two of said lug bolts and in the lug bolt holes therefor to fix said wheel and tire assembly in said last mentioned location.

References Cited by the Examiner

UNITED STATES PATENTS

| 276,292 | 4/83 | Seymour. | |
|---|---|---|---|
| 1,479,482 | 1/24 | Prescott. | |
| 1,607,274 | 11/26 | Hecht | 301—9 X |
| 1,940,675 | 12/33 | Crowther | 301—9 |
| 2,708,119 | 5/55 | Best | 301—1 X |

FOREIGN PATENTS

| 483,687 | 6/52 | Canada. |
|---|---|---|
| 577,826 | 6/46 | Great Britain. |
| 855,956 | 11/52 | Germany. |

ARTHUR L. LA POINT, *Primary Examiner.*